US006670596B2

(12) United States Patent
Tsai et al.

(10) Patent No.: US 6,670,596 B2
(45) Date of Patent: Dec. 30, 2003

(54) RADIOMETRY CALIBRATION SYSTEM AND METHOD FOR ELECTRO-OPTICAL SENSORS

(75) Inventors: Cheng-Chih Tsai, Cerritos, CA (US); Chungte W. Chen, Irvine, CA (US)

(73) Assignee: Raytheon Company, Lexington, MA (US)

( * ) Notice: Subject to any disclaimer, the term of this patent is extended or adjusted under 35 U.S.C. 154(b) by 43 days.

(21) Appl. No.: 09/923,162

(22) Filed: Aug. 6, 2001

(65) Prior Publication Data

US 2003/0025067 A1 Feb. 6, 2003

(51) Int. Cl.$^7$ .............................................. H01L 27/00
(52) U.S. Cl. ................... 250/208.1; 250/559.1
(58) Field of Search ...................... 250/208.2, 208.5, 250/206, 203.2, 203.6, 208.1, 216, 559.1, 332, 341.5, 342, 205; 356/141.1, 222

(56) References Cited

U.S. PATENT DOCUMENTS

| | | | |
|---|---|---|---|
| 4,876,453 A | | 10/1989 | Wirick |
| 5,302,824 A | | 4/1994 | Prager |
| 5,514,865 A | | 5/1996 | O'Neil |
| 5,789,622 A | * | 8/1998 | Quon et al. ................ 702/104 |
| 5,902,994 A | * | 5/1999 | Lisson et al. ............ 250/208.1 |
| 5,925,880 A | * | 7/1999 | Young et al. ............ 250/252.1 |

* cited by examiner

Primary Examiner—David Porta
Assistant Examiner—Patrick J. Lee
(74) Attorney, Agent, or Firm—Colin M. Raufer; Leonard A. Alkov; Glenn H. Lenzen, Jr.

(57) ABSTRACT

A system (100) and method for focal plane array calibration using an internal non-uniform calibration source (30). In the illustrative embodiment, the system (100) includes a first mechanism (16) for calculating a relative gain of each detector element in the focal plane array (20) relative to at least one reference element, a second mechanism (17) for obtaining the absolute gain of the reference element, and a third mechanism (18) for calculating the absolute gains for all other detector elements using the relative gains in conjunction with the absolute gain of the reference element. The relative response of each pixel is calculated from measurements of the response of each pixel using an internal calibration source (30) at two or more different source positions, and two illumination intensities at each position. Measurements using a pair of source positions separated by k pixels establishes the relative response of the $i^{th}$ pixel with respect to the $(i+k)^{th}$ pixel. Through this recursive relationship and other pairs of source position with a different shift vector k, the relative response of every pixel in the FPA can be established. Then, the absolute radiometric calibration of at least one reference pixel is accomplished using a known external source (40), such as a star. The absolute response calibration of each pixel can then be obtained using the recursive relationship in combination with the reference pixels.

14 Claims, 6 Drawing Sheets

RADIOMETRY CALIBRATION SYSTEM AND METHOD FOR ELECTRO-OPTICAL SENSORS

BACKGROUND OF THE INVENTION

1. Field of the Invention

The present invention relates to optical systems. More specifically, the present invention relates to systems and methods calibrating focal plane arrays.

2. Description of the Related Art

A focal plane array (FPA) is an array comprised of several individual detector elements (pixels). Focal plane arrays suffer from non-uniformities due to the variations in sensitivity among the detector elements. These variations must be determined and accounted for in order to achieve proper sensor calibration. Consequently, non-uniformity correction (NUC) measures have been developed for FPA calibration.

Current NUC calibration techniques require a very uniform on-board calibration source to cover the entire focal plane array. With a uniform source, each detector element receives the same source intensity. Variations in the detector outputs are therefore due to variations in detector sensitivity. This information can then be used to calibrate the focal plane array.

Unfortunately, the required system is complicated, bulky, and expensive. It would be very difficult to implement a uniform calibration source for most sensors—particularly for space applications—due to the package and cost restraints. Additionally, the uniformity of the source is almost impossible to maintain over a long period of time as a result of coating aging and source characteristic shift. This problem is further compounded by the fact that space applications typically require sensors to operate in space for several years without maintenance.

An alternative approach for infrared applications uses blackbodies and a complicated mechanism to inject blackbody radiation into the sensor to provide the desired radiometric calibration accuracy. However, this calibrator is bulky and heavy, expensive to fabricate and test, and is a single point failure mechanism. It also has thermal, alignment, and reliability problems, and needs sophisticated equipment to control temperature and maintain current.

Hence, a need remains in the art for an improved system or method for focal plane array calibration that does not require a uniform source.

SUMMARY OF THE INVENTION

The need in the art is addressed by the present invention, which provides a system and method for focal plane array (FPA) calibration using a calibration source which is not required to be uniform. In the illustrative embodiment, the system includes a first mechanism for calculating a relative gain of each detector element in the focal plane array relative to at least one reference element, a second mechanism for obtaining the absolute gain of the reference element, and a third mechanism for calculating the absolute gains for all other detector elements using the relative gains in conjunction with the absolute gain of the reference element.

The relative response of each pixel can be calculated from measurements of the response D of each pixel using an internal calibration source at two or more different source positions and two illumination intensities at each position. Measurements using a pair of source positions separated by k pixels establishes the relative response of the $i^{th}$ pixel with respect to the $(i+k)^{th}$ pixel. Through this recursive relationship and other pairs of source position with a different shift vector k, the relative response of every pixel in the FPA can be established. Then, the absolute radiometric calibration of at least one reference pixel is accomplished using a known external source, such as a star. The absolute response calibration of each pixel can then be obtained using the recursive relationship in combination with the reference pixels.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention provides a system and method for focal plane array (FPA) calibration using an internal non-uniform calibration source. In accordance with the present teachings, a recursive relationship between the relative gain of each detector element (pixel) in the FPA is first calculated using the internal source. Then, the absolute gain of a few reference pixels is determined using a known external source. Finally, the absolute gain of all the pixels is obtained using the recursive relationship in combination with the reference pixels.

The relative response of each pixel is calculated from measurements of the response D of each pixel using an internal calibration source at two or more different source positions. Measurements using a pair of source positions separated by k pixels establishes the relative response of the $i^{th}$ pixel with respect to the $(i+k)^{th}$ pixel. Through this recursive relationship and other pairs of source position with a different shift vector k, the relative response of every pixel in the FPA can be established. Then, the absolute radiometric calibration of a few reference pixels is accomplished using a known external source, such as a star. The absolute response calibration of each pixel can then be obtained using the recursive relationship in combination with the reference pixels.

Figure 1:
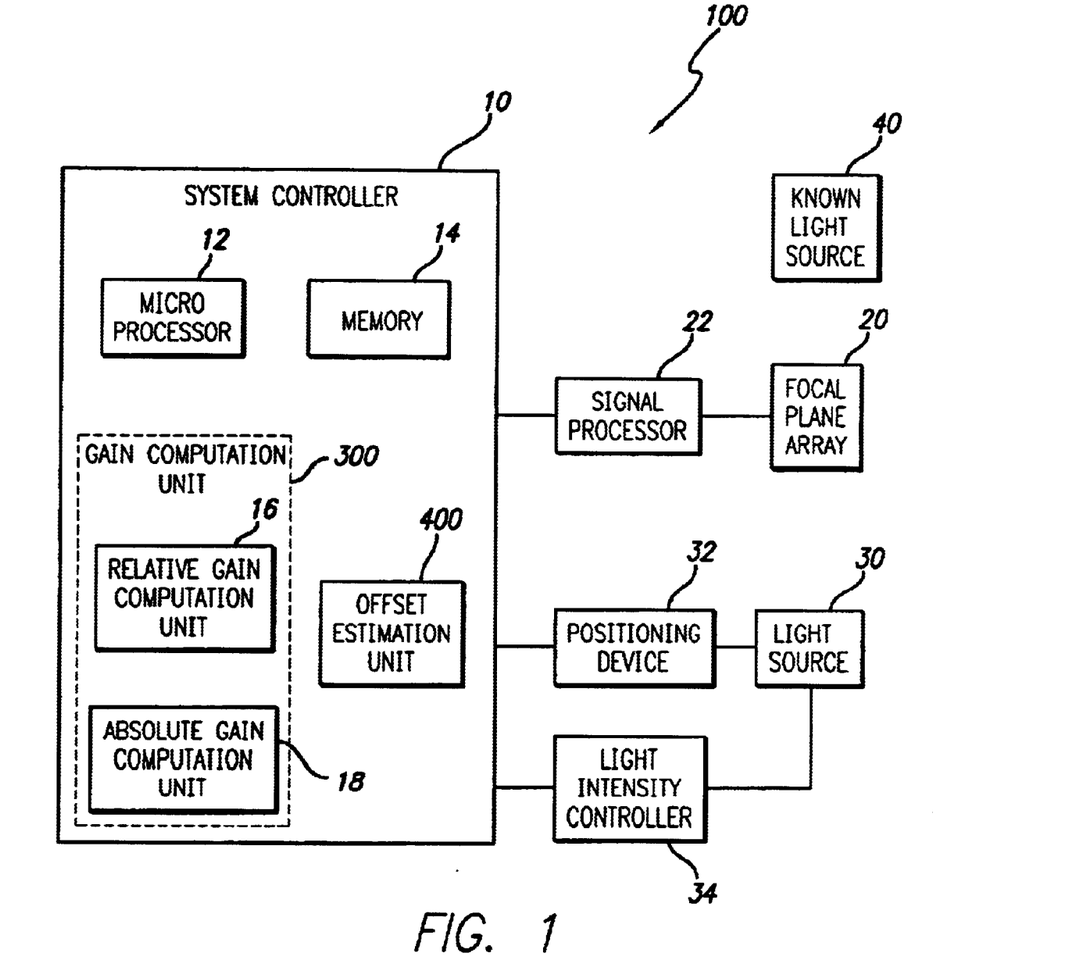
FIG. 1 is a block diagram of a system for focal plane array calibration designed in accordance with the teachings of the present invention.

FIG. 1 is a block diagram of an illustrative embodiment of a system 100 for focal plane array calibration designed in accordance with the teachings of the present invention. The system 100 includes a focal plane array 20, an internal calibration source 30, and a system controller 10. The FPA 20 includes multiple detector elements. The internal calibration source 30 produces radiation of the type to be detected by the FPA. A visible light sensor, for instance, would have a light source, while an infrared sensor would have a heat source. The calibration source is not required to be uniform. The system controller 10 includes a processor 12, memory 14, a detector gain computation unit 300, and a detector offset estimation unit 400.

The detector gain computation unit 300 is comprised of a unit 16 for computing the relative gains, a unit 18 for obtaining the absolute gain of at least one reference pixel, and a unit 18 for computing the absolute gains for all pixels. The relative gains are computed from detector measurements using the internal calibration source 30. Obtaining the absolute gain of the reference pixel requires at least one detector element to be calibrated using a known calibration source 40, such as a star. The absolute gains of all the other pixels can then be calculated using the relative gains and the absolute gain of the reference pixel. In the preferred embodiment the gain computation unit 300 and the offset estimation unit 400 are implemented in software residing in the system memory 14 and executed by the microprocessor 12.

The calibration system 100 also includes a signal processor 22, a source positioning device 32, and a light intensity controller 34. The signal processor 22 processes detector outputs from the FPA 20 and sends processed data to the system controller 10. The source positioning device 32 moves the source illumination to different positions with respect to the FPA 20. The positioning device 32 can be implemented by moving the calibration source, moving the FPA, inserting a thin wedge or pair of wedges between the source and the FPA, or tilting a mirror or inserting a wedge located in either the entrance pupil or the exit pupil of the light source. The light intensity controller 34 adjusts the intensity level of the calibration source. This can be implemented through a change of the driving voltage or current, or inserting a neutral density filter.

The response D of a detector element i is a function of the illumination level L, the gain G of the pixel, and the bias B of the pixel, as given by the following equation:

$$D_i = G_i L + B_i \quad [1]$$

The gain G and bias B of each pixel in the focal plane array are the two parameters which need to be calibrated.

Detector calibration needs the knowledge of the irradiance levels L at each detector when data is taken. Except under elaborate setup, the detailed detector irradiance levels are not always available, particularly when the detector illumination is not uniform and may not be known accurately. If the detector illumination is shifted by a shift vector k, where k is an integer equal to or greater than 1, while the illumination profile remains unchanged, then the detector sensitivity ratio between a pair of detectors separated by the shift vector can be determined. The set of source shifts has to be able to establish gain ratio relations between all detector pairs. The irradiance of detector i before shifting and detector i+k after shifting are equal. The sensitivity ratio between detectors i and i+k can be determined without the knowledge of the absolute irradiance. Only the ratio of the irradiance levels is required. This is illustrated in FIG. 2.

Figure 2A:
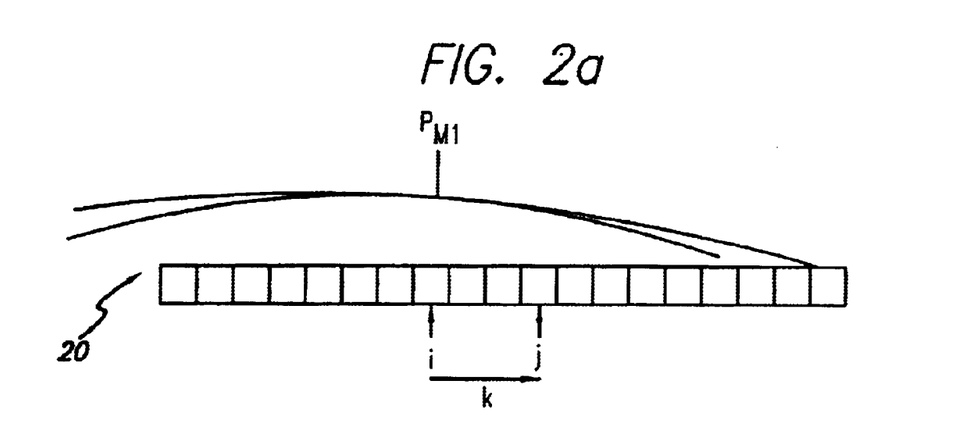
FIG. 2a is a diagram of a focal plane array and the illumination arrangement before the illumination source is shifted in accordance with the present teachings.

FIG. 2a is a diagram of a focal plane array and the illumination arrangement before shifting when the illumination source is located at a position $P_{m1}$.

Figure 2B:
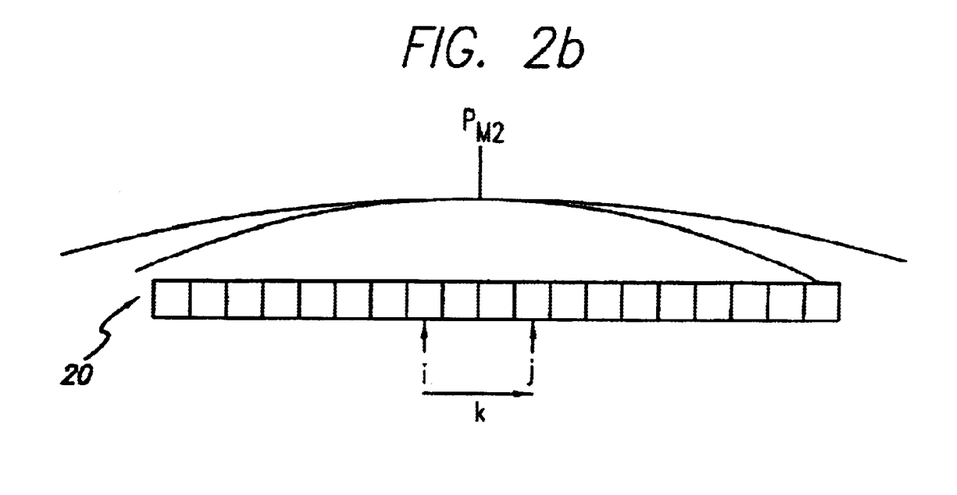
FIG. 2b is a diagram of a focal plane array and the illumination arrangement after the illumination source is shifted by a shift vector k in accordance with the present teachings.

FIG. 2b shows the situation after the illumination source has been shifted by a shift vector k, which is the distance between k pixels, such than the source is located at a position $P_{m2}$. The two detector elements i and j are located k pixels apart (j=i+k). The illumination level at detector i before shifting is equal to the illumination level at detector j after shifting.

For each illumination position $P_m$, the detector outputs are measured with two illumination levels $L_h$ and $L_l$. The sensitivity ratio $R_{i,j}$ between detectors i and j can be determined from the outputs of detectors i and j taken at the two illumination levels. $D_i(P_{m1},L_h)$ and $D_i(P_{m1},L_l)$ are the outputs from detector i with the source at position $P_{m1}$, and illumination levels $L_h$ and $L_l$, respectively. Recall that the detector outputs D are functions of the illumination level L, the gain G, and the bias B:

$$D_i(P_{m1},L_h) = G_i L_h + B_i \quad [2]$$

$$D_i(P_{m1},L_l) = G_i L_l + B_i \quad [3]$$

By measuring detector outputs at two illumination levels, the two unknown parameters gain $G_i$ and bias $B_i$ can be solved. Solving for the gain $G_i$ results in:

$$G_i = \frac{D_i(P_{m1}, L_h) - D_i(P_{m1}, L_l)}{L_h - L_l} \quad [4]$$

The illumination levels at detector j (located k pixels away from detector i) when the illumination source is shifted by k pixels to position $P_{m2}$ is the same as the illumination levels at detector i before shifting (source at position $P_{m1}$). $D_j(P_{m2},L_h)$ and $D_j(P_{m2}, L_l)$ are the outputs from detector j with the source at position $P_{m2}$, illumination levels $L_h$ and $L_l$, respectively. Accordingly, the gain $G_j$ of detector j is given by:

$$G_j = \frac{D_j(P_{m2}, L_h) - D_j(P_{m2}, L_l)}{L_h - L_l} \quad [5]$$

The sensitivity ratio $R_{i,j}$ between detectors i and j can then be computed using only the detector outputs (knowledge of the absolute values of the illumination levels is not needed):

$$R_{i,j} = \frac{G_i}{G_j} = \frac{D_i(P_{m1}, L_h) - D_i(P_{m1}, L_l)}{D_j(P_{m2}, L_h) - D_j(P_{m2}, L_l)} \quad [6]$$

Similarly, the illumination intensity at detector j with the source at position $P_{m1}$ (before shifting) is the same as the illumination intensity at a detector n=j+k with the source at position $P_{m2}$ (after shifting k pixels). The sensitivity ratio $R_{j,n}$ between detectors j and n is given by:

$$R_{j,n} = \frac{D_j(P_{m1}, L_h) - D_j(P_{m1}, L_l)}{D_n(P_{m2}, L_h) - D_n(P_{m2}, L_l)} \quad [7]$$

The relationship between detector n and the first detector i can then be determined. The sensitivity ratio $R_{i,n}$ between detectors i and n is given by:

$$R_{i,n} = R_{i,j} R_{j,n} \quad [8]$$

By using this chain relation, the sensitivity of any detector relative to a selected reference detector can be evaluated from sets of detector data taken with the proper illumination shifts.

There can be several paths from one detector to another detector to apply chain relations for evaluating relative detector sensitivities. This is particularly true for a two dimensional detector array. When using only one path to determine the sensitivity of a detector relative to the reference detector, it will suffer from problems such as error propagation and accumulation when there is a bad detector or bad data along the path. All paths should therefore be utilized to minimize error propagation.

The best way to achieve using all possible paths of sensitivity relations is to set up and solve least-squares fit equations. The least-squares fit equations are obtained from all the sensitivity ratio equations:

$$R_{i,j} = \frac{D_i(P_{m1}, L_h) - D_i(P_{m1}, L_l)}{D_j(P_{m2}, L_h) - D_j(P_{m2}, L_l)} = \frac{g_i}{g_j} \quad [9]$$

or:

$$R_{i,j}g_j - g_i = 0 \quad [10]$$

where a lower case g represents relative gain. The least squares equations can only be solved up to an arbitrary normalization constant which can be chosen to be the gain coefficient of the reference detector.

For a large detector array, the least squares equations can be solved using a sparse matrix solver.

Figure 3:
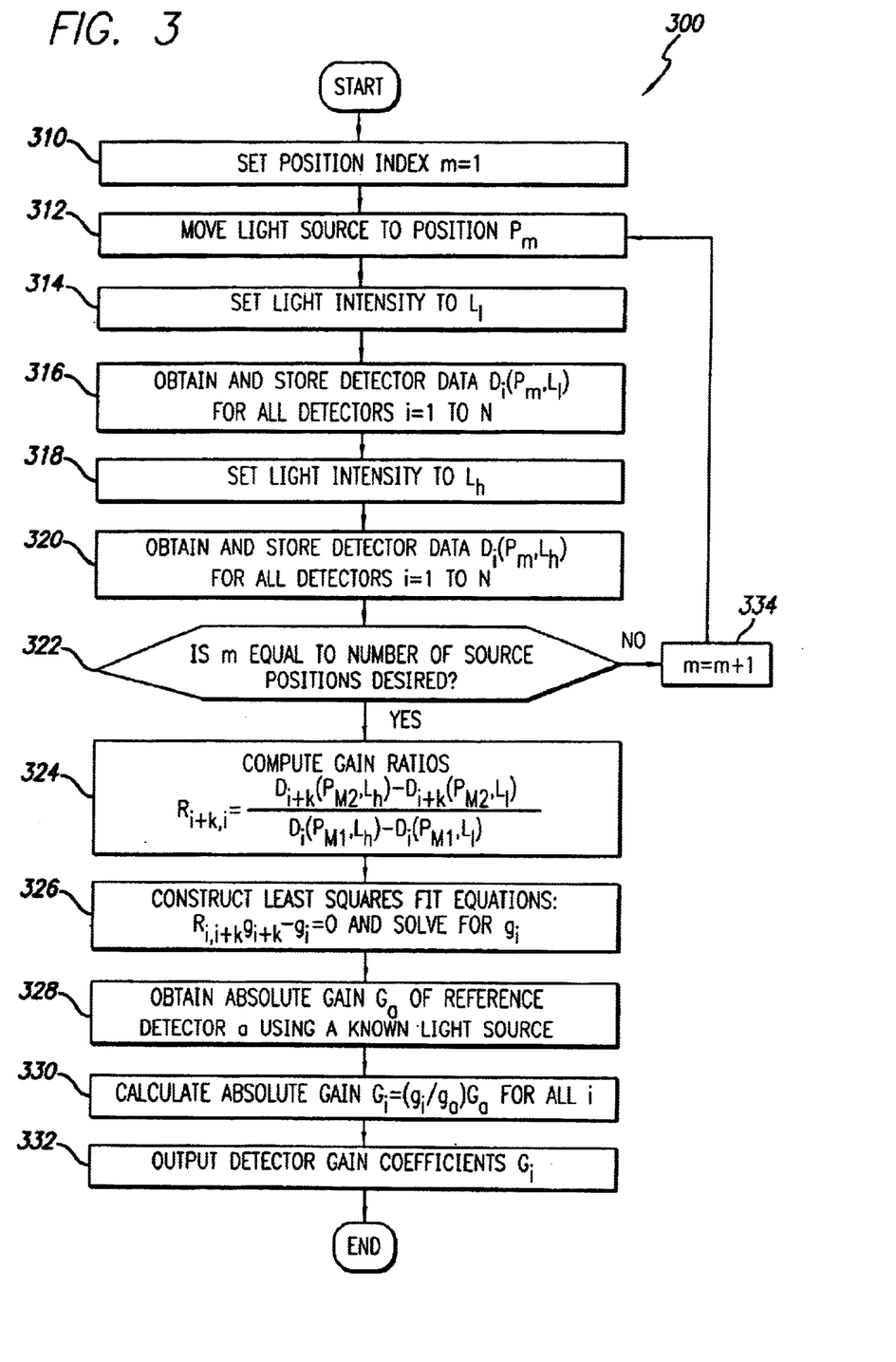
FIG. 3 is a flow diagram of a system for calibrating detector gain coefficients designed in accordance with the teachings of the present invention.

FIG. 3 is a flow diagram of a system 300 for calibrating detector gain coefficients designed in accordance with the teachings of the present invention.

At Step 310, a source position index m is set to 1.

At Step 312, the light source is moved to a location $P_m$.

At Step 314, the light source intensity level is set to $L_l$.

At Step 316, the response $D_i(P_m, L_l)$ of each detector element i is obtained and stored, for all the detector elements i=1 to N, where N is the total number of elements.

At Step 318, the light source intensity level is set to $L_h$.

At Step 320, the response $D_i(P_m, L_h)$ of each detector element i is obtained and stored, for all the detector elements i=1 to N, where N is the total number of elements.

At Step 322, determine whether m is equal to the total number of source positions desired. If no, then data must be taken at the next source position: go to Step 334. If yes, then continue to Step 324.

At Step 334, the position index m is increased by 1 and the system returns to Step 312.

At Step 324, the detector gain ratio $R_{i+k,i}$ is computed for all combinations of detectors:

$$R_{i+k,i} = \frac{D_{i+k}(P_{m2}, L_h) - D_{i+k}(P_{m2}, L_l)}{D_i(P_{m1}, L_h) - D_i(P_{m1}, L_l)} \quad [11]$$

At Step 326, the least-squares fit equations are constructed from the set of gain coefficient equations:

$$R_{i,j+k}g_i - g_{i+k} = 0 \quad [12]$$

The least-squares fit equations are solved for $g_i$ up to an arbitrary normalization constant.

At Step 328, the absolute gain coefficient $G_a$ of a selected reference detector a is determined by pointing it at a known intensity point source (such as a star) and obtaining the detector response. The detector bias offsets should be determined prior to executing Step 328. One method for evaluating the bias offsets is given below.

At Step 330, the absolute gain coefficients $G_i$ of the other detectors are calculated:

$$G_i = \left(\frac{g_i}{g_a}\right)G_a \quad [13]$$

Finally, at Step 332, output the absolute gain coefficients $G_i$ for all the detectors i=1 to N.

In addition to the gain coefficients $G_i$, the bias offsets $B_i$ of each detector must also be calculated for proper focal plane array calibration. From Equations 2 and 3, the offset $B_i$ can be determined to be:

$$B_i = D_i(P_m, L_l) - \frac{D_i(P_m, L_h) - D_i(P_m, L_l)}{L_h - L_l} L_l \quad [14]$$

Offset calculations using measurements from different positions $P_m$ may result in different answers. For best results, the offset $B_i$ should be the average of the offsets $B_i(m)$ calculated from measurements at each position $P_m$.

Figure 4:
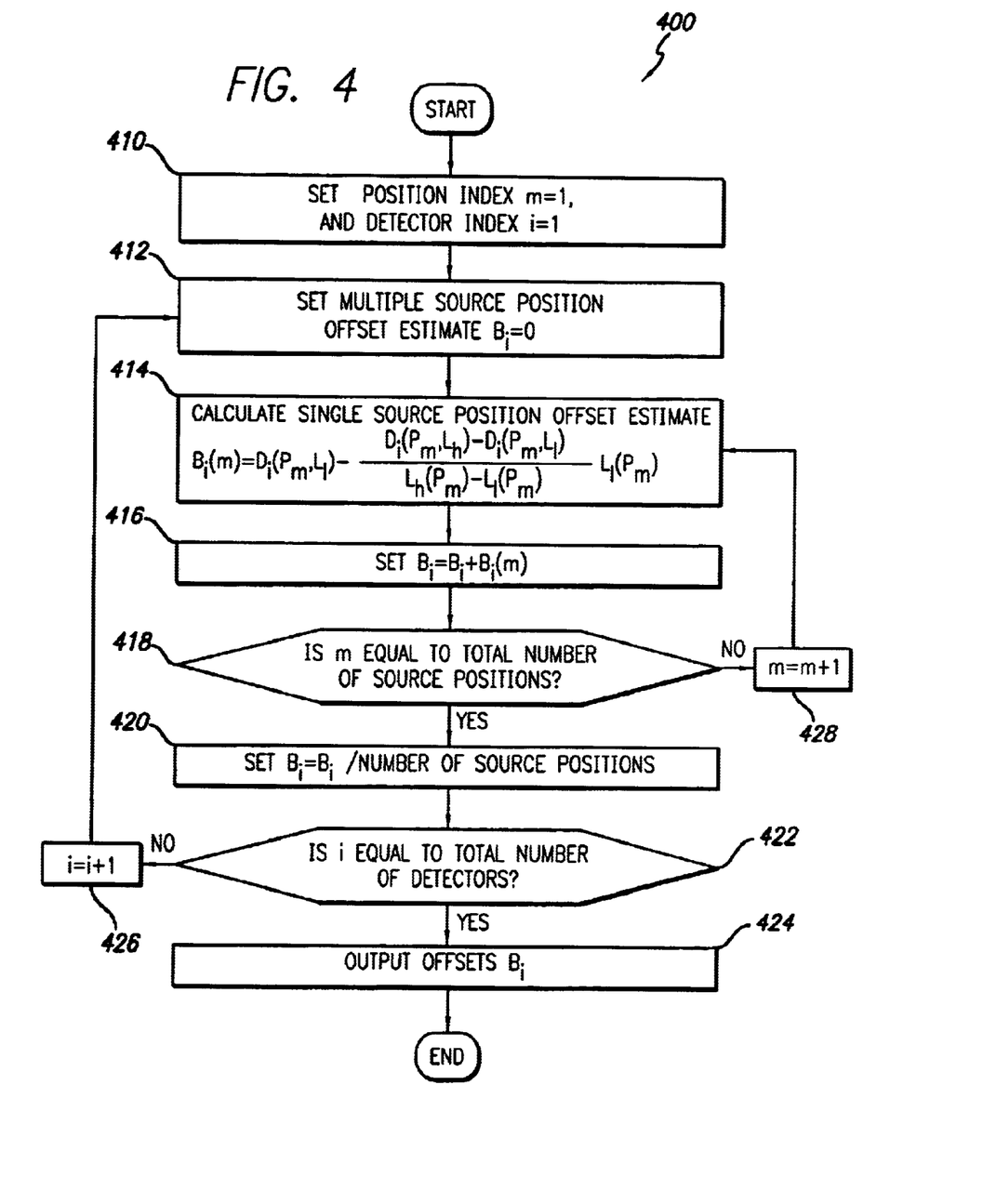
FIG. 4 is a flow diagram of a system for estimating detector offsets designed in accordance with the teachings of the present invention.

FIG. 4 is a flow diagram of a system 400 for estimating detector offsets designed in accordance with the teachings of the present invention.

At Step 410, a position index m is set to 1, and a detector index i is set to 1.

At Step 412, a multiple source position offset estimate $B_i$ is set to 0.

At Step 414, compute a single source position offset estimate $B_i(m)$:

$$B_i(m) = D_i(P_m, L_l) - \frac{D_i(P_m, L_h) - D_i(P_m, L_l)}{L_h(P_m) - L_l(P_m)} L_l(P_m) \quad [15]$$

Since the factor containing intensity levels is in the form:

$$\frac{L_l(P_m)}{L_h(P_m) - L_l(P_m)} = \frac{1}{\frac{L_h(P_m)}{L_l(P_m)} - 1} \quad [16]$$

only the ratio between intensity levels $L_h/L_l$ needs to be known rather than the absolute intensity levels themselves.

At Step 416, the offset estimate at this position is added to the offset estimates at other positions:

$$B_i = B_i + B_i(m) \quad [17]$$

At Step 418, determine whether m is equal to the total number of source positions. If no, repeat with the next source position: go to Step 428. If yes, continue to Step 420.

At Step 428, increase the position index m by 1, and return to Step 414.

At Step 420, compute the average offset estimation for detector i:

$$B_i = B_i/\text{Total Number of Source Positions} \quad [18]$$

At Step 422, determine whether the offset has been estimated for all detectors i=1 to N. If no, repeat with the next detector: go to Step 426. If yes, continue to Step 424.

At Step 426, increase the detector index i by 1, and return to Step 412.

Finally, at Step 424, output the offset estimates $B_i$ for all the detectors i=1 to N.

Computer simulation has shown that better than 1% calibration accuracy can be achieved using this technique despite a 5-to-1 detector sensitivity variation with a 2-to-1 variation in calibration source uniformity. This is demonstrated in FIGS. 5 and 6.

Figure 5:
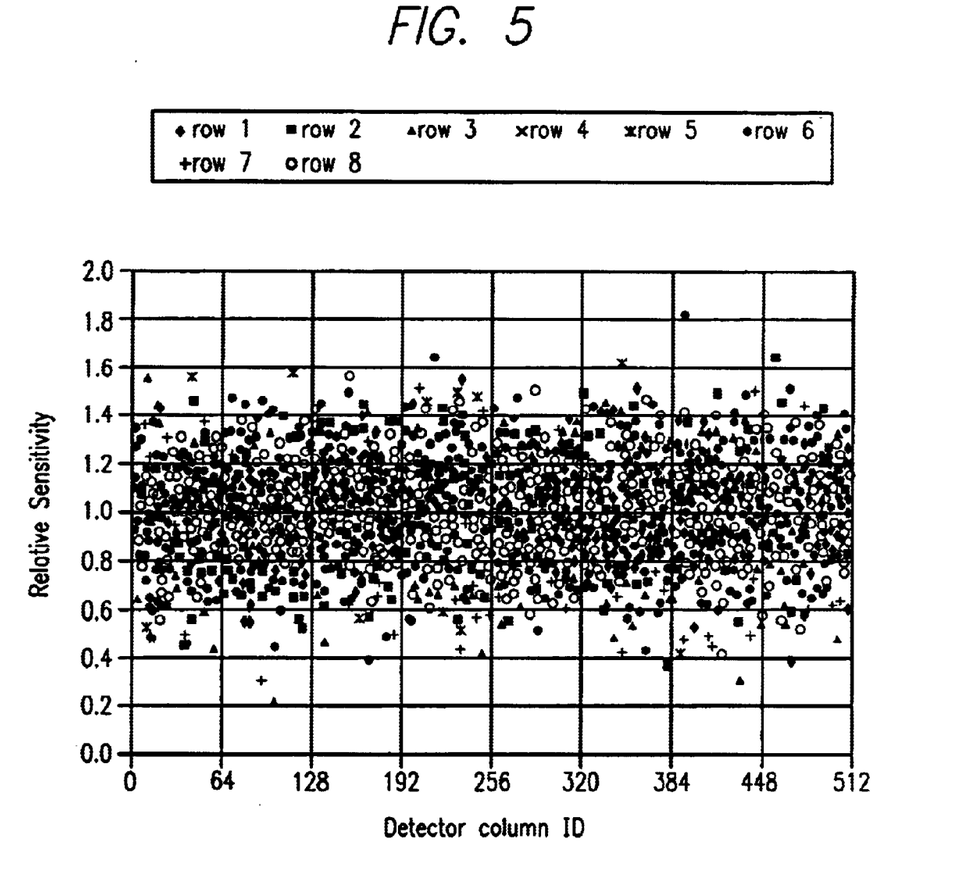
FIG. 5 is a scatter plot of detector relative sensitivity of a typical focal plane array.

FIG. 5 shows a scatter plot of detector relative sensitivity of a focal plane array with 5-to-1 detector sensitivity variation.

Figure 6:
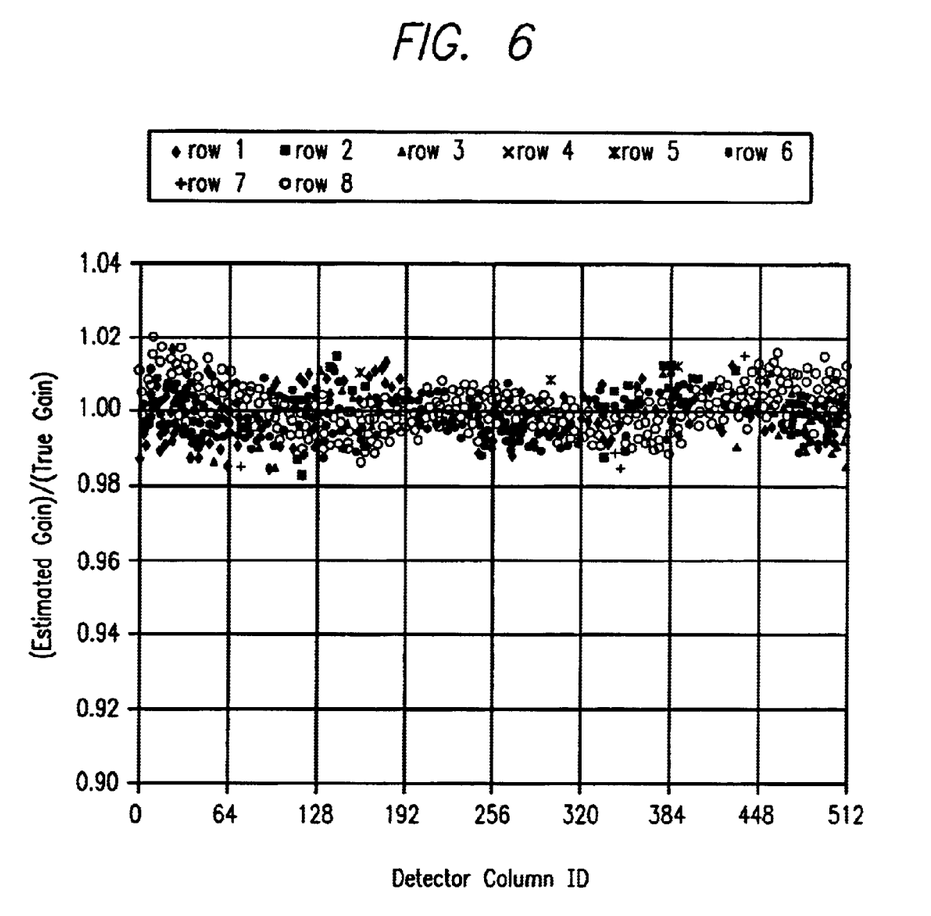
FIG. 6 is a scatter plot of detector sensitivity after calibration in accordance with the present teachings.

FIG. 6 shows a scatter plot of detector sensitivity after calibration in accordance with the present teachings. Detector sensitivity is shown to have better than 1% RMS accuracy.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for calibration of a focal plane array comprising:
    first means for obtaining a relative gain of a set of adjacent and nonadjacent detector elements in said focal plane array relative to at least one reference element;
    second means for obtaining an absolute gain of said reference element; and
    third means for computing absolute gains for said adjacent and nonadjacent detector elements using said relative gains and said absolute gain of said reference element.

2. The invention of claim 1 wherein said first means includes an internal calibration source.

3. The invention of claim 2 wherein said internal calibration source is non-uniform.

4. The invention of claim 2 wherein said internal calibration source is a light source.

5. The invention of claim 2 wherein said internal calibration source is a heat source.

6. The invention of claim 2 wherein said first means includes means for making measurements from each detector element while said internal calibration source is located in at least one pair of positions, wherein said pair of positions is separated by the distance between k pixels, where k is an integer equal to or greater than 1.

7. The invention of claim 6 including means for obtaining said measurements with two different intensity levels of said internal calibration source at each position.

8. The invention of claim 1 wherein said first means includes means for solving least-squares fit equations constructed from $R_{i,i+k}g_i - g_{i+k}=0$ where $R_{i,i+k}$ is the sensitivity ratio between detectors i and i+k and $g_i$ is the relative gain of detector i.

9. The invention of claim 7 including means for solving said least-squares fit equations using a sparse matrix solver.

10. The invention of claim 1 wherein said second means includes an external calibration source.

11. The invention of claim 10 wherein said external calibration source is a known star.

12. The invention of claim 1 wherein said system further includes fourth means for obtaining bias offsets of each detector element in said focal plane array.

13. A system for calibration of a focal plane array comprising:
    a focal plane array;
    a signal processor for processing data from the focal plane array;
    an internal calibration source;
    a source positioning device for moving said calibration source relative to said focal plane array;
    a source intensity controller for adjusting an intensity level of said calibration source;
    a microprocessor;
    a memory device;
    a first program for obtaining a relative gain of a set of adjacent and nonadjacent detector elements in said focal plane array relative to at least one reference element using said internal calibration source, wherein said first program resides in said memory device and is executed by said microprocessor;
    a second program for obtaining an absolute gain of said reference element using an external calibration source, wherein said second program resides in said memory device and is executed by said microprocessor;
    a third program for computing absolute gains for said adjacent and nonadjacent detector elements using said relative gains and said absolute gain of said reference element wherein said third program resides in said memory device and is executed by said microprocessor; and
    a fourth program for estimating bias offsets of each detector element wherein said fourth program resides in said memory device and is executed by said microprocessor.

14. A method for calibrating a focal plane array including the steps of:
    obtaining a relative gain of a set of adjacent and nonadjacent detector elements in said focal plane array relative to at least one reference element;
    obtaining an absolute gain of said reference element; and
    computing absolute gains for said adjacent and nonadjacent detector elements using said relative gains and said absolute gain of said reference element.

* * * * *